US008262150B2

(12) United States Patent
Harding et al.

(10) Patent No.: US 8,262,150 B2
(45) Date of Patent: Sep. 11, 2012

(54) DRIVE SYSTEM FOR PIVOTAL AND/OR SLIDABLE DOORS OR FOR ENTRY AND EXIT FACILITIES WITH IMPROVED POSITION ACQUISITION

(75) Inventors: Alfons Harding, Borchen (DE); Dirk Müller, Kaufungen (DE); Klaus Meyerrose, Niestetal (DE)

(73) Assignee: Gebr. Bode GmbH & Co. KG (DE)

( * ) Notice: Subject to any disclaimer, the term of this patent is extended or adjusted under 35 U.S.C. 154(b) by 169 days.

(21) Appl. No.: 12/743,994

(22) PCT Filed: Oct. 30, 2008

(86) PCT No.: PCT/EP2008/064723

§ 371 (c)(1),
(2), (4) Date: Jun. 10, 2010

(87) PCT Pub. No.: WO2009/065712

PCT Pub. Date: May 28, 2009

(65) Prior Publication Data

US 2010/0287842 A1 Nov. 18, 2010

(30) Foreign Application Priority Data

Nov. 20, 2007 (DE) ..................... 20 2007 016 273 U

(51) Int. Cl.
*B60J 1/08* (2006.01)

(52) U.S. Cl. ........................ 296/146.1; 49/360; 318/266

(58) Field of Classification Search ............... 296/146.1, 296/146.8, 147, 155; 49/360; 318/265, 266
See application file for complete search history.

(56) References Cited

U.S. PATENT DOCUMENTS 5,757,156 A * 5/1998 Sasajima ....................... 318/456
7,073,291 B2 * 7/2006 Kawanobe et al. ............... 49/26
(Continued)

FOREIGN PATENT DOCUMENTS

DE 202004007704 U1 10/2005
(Continued)

OTHER PUBLICATIONS

International Search Report PCT/EP2008/064723; Dated Jan. 30, 2009.

*Primary Examiner* — Lori Lyjak
(74) *Attorney, Agent, or Firm* — Cantor Colburn LLP

(57) ABSTRACT

A drive system for an entry/exit facility with at least one pivotably and/or slidably mounted door, ramp, tread or the like of a passenger transport vehicle, the system including at least one actuator or drive motor and a mechanical system driven by it and/or a gear unit for effecting the pivoting or sliding movement of the door, ramp, tread or the like, with an absolute value encoder for acquiring a momentary position during the pivoting or sliding movement, where an evaluation unit is configured to compare the momentary position with at least one reference position stored in a non-volatile memory of the evaluation unit in order to generate an output signal dependent thereon, and the absolute value encoder is flange-connected to a pin that fixes the pivoting movement of the door, ramp, tread or the like, and the gear unit includes a first reduction gear unit, a second reduction gear unit, and a controllable coupling is provided between the reduction gear units.

11 Claims, 2 Drawing Sheets

U.S. PATENT DOCUMENTS

| | | | | |
|---|---|---|---|---|
| 2002/0119861 | A1 | 8/2002 | Ishihara | |
| 2003/0046872 | A1 | 3/2003 | Fukumura | |
| 2004/0189046 | A1 * | 9/2004 | Kawanobe et al. | 296/155 |
| 2004/0189947 | A1 * | 9/2004 | Hattori et al. | 353/13 |
| 2005/0110300 | A1 * | 5/2005 | Oxley et al. | 296/155 |
| 2006/0175865 | A1 * | 8/2006 | Ichinose et al. | 296/146.2 |
| 2007/0194600 | A1 | 8/2007 | Oxley | |

FOREIGN PATENT DOCUMENTS

| | | | |
|---|---|---|---|
| DE | 202006005485 | U1 | 7/2006 |
| DE | 102005029630 | A1 | 12/2006 |
| DE | 202005011221 | U1 | 1/2007 |
| DE | 202005015166 | U1 | 3/2007 |
| DE | 202005015168 | U1 | 3/2007 |
| DE | 202005015169 | U1 | 3/2007 |
| DE | 202006002455 | U1 | 8/2007 |
| DE | 202007009719 | U1 | 10/2007 |

* cited by examiner

DRIVE SYSTEM FOR PIVOTAL AND/OR SLIDABLE DOORS OR FOR ENTRY AND EXIT FACILITIES WITH IMPROVED POSITION ACQUISITION

TECHNICAL FIELD

The invention generally relates to a drive system for an entry/exit facility with at least one pivotably and/or slidably mounted door, ramp, tread or the like of a passenger transport vehicle, an entry/exit facility provided therewith as well as a passenger transport vehicle equipped therewith.

BACKGROUND

A drive system of this type generally comprises at least one actuator or a drive motor and a mechanical system driven by it, and/or a gear unit for effecting the pivoting or sliding movement of the door, ramp, tread or the like.

Acquiring the pivoting movement of the mechanical system or of the gear unit by means of, for example, a potentiometer pick-off is known. Such a potentiometer assembly has proven in practice not to be sufficiently wear-resistant and robust in order to satisfy the high safety requirements in passenger transportation. Moreover, it is known to control or at least monitor the pivoting or sliding movement by means of switching contacts triggering at the final positions. Though a high degree of reliability can be achieved depending on the switching contact structure, and also by means of redundant components, what is a drawback in this case, however, is that these final positions are fixed once the installation and adjustment has taken place. A later adjustment, for example during the final assembly of the entry/exit facility into a passenger transport vehicle has proved to be very time-consuming due to the comparatively poor accessibility of the switching contacts. This poor accessibility on the one hand is due to the desired compactness of such drives, and on the other hand, to these switching contacts generally being disposed directly on the moving door, ramp, tread etc., for example on their associated pivoting pins, and not on the driving mechanical system, in order thus to be certain these moving elements, such as the door, ramp, tread etc. are actually in the state displayed by the state of the switching contact, for example open or closed. Furthermore, it was found that during operation, a later adjustment is often required during the operating life of the vehicle because of wear and the accompanying increasing clearance between the mechanically interacting components.

BRIEF SUMMARY

The disclosure generally seeks to provide a drive system for an entry/exit facility with at least one pivotably and/or slidably mounted door, ramp, tread or the like of a passenger transport vehicle, in which the position acquisition can be adjusted in a simplified manner.

The drive system according to the invention is intended for an entry/exit facility with at least one pivotably and/or slidably mounted door, ramp, tread or the like of a passenger transport vehicle, and is not limited to this. This is, for example, a single-leaf or multiple-leaf outward-swinging or inward-swinging door or a folding door or sliding door as it is used in the entrance or exit area of buses, rail vehicles and the like. Swinging doors are known from the published DE 202006005485 U1, DE 202005015169 U1, DE 202005015168 U1, and DE 202005015166 U1 by the same applicant, which are herewith incorporated by reference, as are the documents cited below. Since the invention is not limited to the type of door used and its direction of movement for reaching the opened and closed state, which is dependent on its mounting, the drive system according to the invention is advantageously also used in a combination of a swinging door and a sliding door, as it is known, for example, from DE 202007009719 U1 by the same applicant. Moreover, it may also be an extendible ramp attached parallel to the bottom of the vehicle, as it is known, for example, from DE 202004007704 U1 or DE 202005011221 U1 by the same applicant. A pivotable tread is known, from example, from DE 202006002455 U1. The drive system according to the invention comprises at least one actuator, for example a hydraulic or air-pressure-driven adjusting cylinder, or a drive motor and a mechanical system driven by it, and/or a gear unit for effecting the pivoting or sliding movement of the door, ramp, tread or the like. According to the invention, an absolute value encoder, for example, an analog rotary encoder, is provided for acquiring a momentary position during the pivoting or sliding movement. In one embodiment, the absolute value encoder picks off a rotary or pivoting movement of a component of the gear unit or of the mechanical system which according to the invention serve for transmitting the movement of the rotary or linear drive of the actuator or of the drive motor onto the door, ramp or the tread etc. For example, the absolute value encoder is flange-mounted to an output shaft of a reduction gear unit. Due to its construction, the absolute value encoder supplies an unequivocal signal corresponding to the respective momentary position of the pivoting movement or of the sliding movement.

The drive system according to the invention is characterized in that an evaluation unit is provided, which is configured to compare the momentary position with at least one reference position stored in a non-volatile memory of the evaluation unit in order to generate an output signal dependent thereon, i.e. on the result of the comparison. The reference position can be a final position, such as that of the opened or closed door, that of the retracted or extended ramp, or that of a tread that is pivoted in or out. By using the absolute value encoder with an evaluation unit that compares its signal, which corresponds to the momentary position, with a reference value, the number of limit switches corresponding to the reference positions can be dispensed with. Moreover, the technical drawbacks connected with the limit switches, such as complicated mechanical adjustment and a malfunction susceptibility that remains because of mechanical triggering, do not apply. Moreover, the drive system can thus be produced more inexpensively. In contrast to a pure control system with limit switches, the momentary position of the door or the like, even after a power failure, is always known because of the absolute value encoder, and can be compared with the reference value stored in a non-volatile way, so that no initialization procedure is required after a power failure in order to determine the actual momentary position. Furthermore, in the case of a possibly necessary adjustment, only the replacement of the at least one reference value stored in the non-volatile memory is required, without any mechanical adjustment being required, which is time-consuming and thus accompanied by long down times. In one embodiment, the output signal, which is dependent on the result of the comparison of the momentary position with the reference position, is supplied to a monitoring device that displays, on a system panel, for example in the driver's cab, the corresponding position of the door, tread or ramp, or the fact that an associated final position has been reached.

Preferably, the output signal is used for controlling the drive motor or the actuator, in order to have the drive motor or the actuator switch off when a reference position is reached, for example. Thus, providing limit switches can be dispensed with.

The output signal outputted by the evaluation unit for further processing by a motor control system or a monitoring device can be analog or digital, for example a serial bit pattern. In order to increase malfunction immunity, a digital signal is outputted.

In a preferred embodiment, the evaluation unit is designed such that the output signal corresponds to a defined, preferably digital signal value in the case in which the momentary position corresponds to one of the reference positions. For example, a limit switch is thus simulated which assumes a defined switching state when a final position is reached. Thus, the output signal can advantageously be processed further by a known monitoring device adapted to the use of limit switches.

The absolute value encoder, in a further advantageous embodiment, acquires the pivoting or sliding movement without contact. Malfunction immunity can thus be increased. For example, the absolute value encoder works in accordance with an optical or magnetic principle.

Preferably, the absolute value encoder generates a digital signal for evaluation by the evaluation unit. Absolute rotary encoders output a certain coded numerical value (code value) for each angular position. This code value is available immediately after switching on, even without movement of the encoder axis. A code disc is fixedly mounted on the encoder axis. The disc is divided into individual segments which in an absolute value encoder working according to an optical principle are alternately transparent and opaque and which are read out by a light barrier. The absolute values from the encoder to the evaluation unit are transmitted, for example, serially. Special protocols, such as SSI, PROFIBUS-DP or EnDat (company Heidenhain) are being used in the process. Due to the serial communication, other data can be transmitted in addition to the momentary position. They can include current temperature values of the encoder or the electrical data of the drive motor to which the encoder is flange-mounted (so-called electrical rating plate). If a pivoting movement is acquired, then a rotary encoder can be used, if only one rotation, maximally, is to be resolved, then a so-called single turn encoder is used, if several rotations are to be resolved, a so-called multi-turn encoder is used. Optical multi-turn encoders generally comprise Ieral code discs internally connected via a gear unit.

In another advantageous embodiment, the absolute value encoder is flange-connected to the drive shaft of the drive motor; a multi-turn encoder is usually used in this case. Therefore, the drive system according to the invention can be designed comparatively compact.

Alternatively, the absolute value encoder is flange-connected to a pin that fixes the pivoting movement of the door, ramp, tread or the like. Therefore, comparatively cheaper single-turn encoders can be used. In addition, a very exact and reproducible position acquisition and thus, if necessary, control of the movement is achieved because of the direct arrangement of the encoder on the moving element, i.e. the door, ramp, tread etc., so that the clearance in the mechanical system or gear unit transmitting the drive force can be compensated. Furthermore, possible material fractures within the mechanical system or the gear unit can be recognized and reported, for example because the encoder does not detect that the reference position is reached in spite of an activation of the actuator or drive motor for a longer period of time.

In another advantageous embodiment, the evaluation unit is programmable. For example, at least the non-volatile memory for recording the reference values is programmable; the non-volatile memory is, for example, an EEPROM or NV-RAM. The reference values can thus be replaced particularly easily for an adjustment. The evaluation unit is programmed, for example, by means of a BUS system, such as the CAN bus.

In another embodiment, the mechanical system or the gear unit is configured to be non-self-locking. Because of the lack of self-locking action, the manual actuation of the entry/exit facility is always ensured in the case of an emergency, only the blocking effect of a blocking device, which is additionally present for safety reasons, must be canceled. This results in a high degree of safety. This type of drive is particularly suitable for combination with an absolute value encoder and an associated evaluation unit, because the position of the door is detectable at all times even after manual actuation of the entry/exit facility.

Another embodiment is characterized in that the gear unit comprises a first reduction gear unit, a second reduction gear unit as well as a controllable coupling between the first reduction gear unit. Because the entire reduction gear unit is constituted of two reduction gear units that can be separated by a coupling, it can be achieved, if the reduction ratio of the two reduction gear units is selected appropriately, that, after disengaging the coupling, a manual actuation of the entry/exit facility against the now reduced self-locking action is possible. This type of drive is particularly suitable for combination with an absolute value encoder and an associated evaluation unit, because the position of the door is detectable at all times even after manual actuation of the entry/exit facility.

The invention moreover relates to an entry/exit facility for a passenger transport vehicle characterized by the drive system in the above described embodiments and the advantages respectively connected therewith. The invention furthermore relates to a passenger transport vehicle equipped accordingly.

BRIEF DESCRIPTION OF THE DRAWINGS

In the attached figures, parts of two preferred embodiments of the drive system according to the invention for an entry/exit facility with at least one pivotably and/or slidably mounted door are shown, but in each case without the evaluation unit according to the invention, without limiting the invention thereto, wherein.

DETAILED DESCRIPTION

Figure 1:
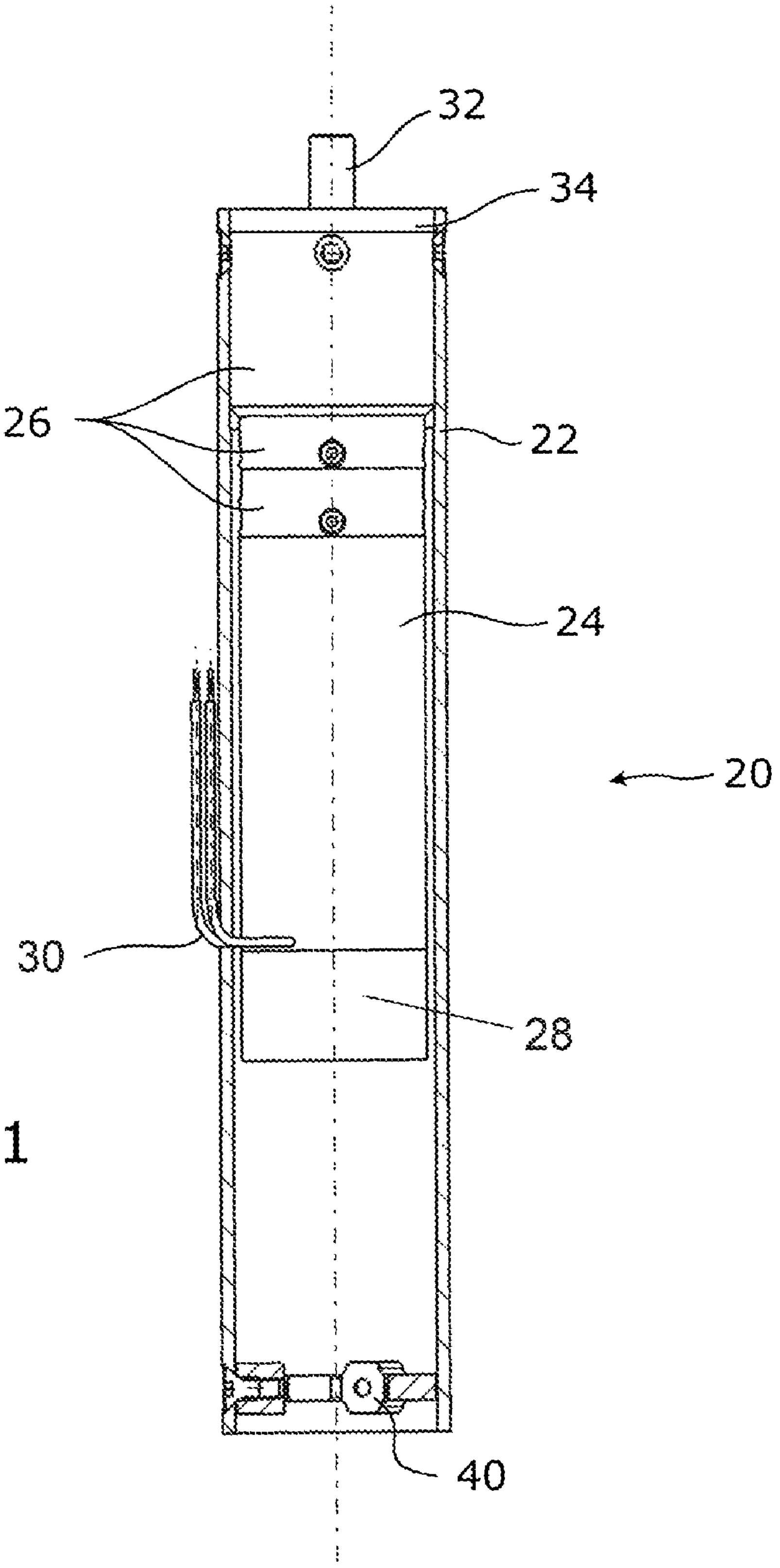
FIG. 1 shows a first embodiment of the drive system according to the invention for an entry/exit facility in a schematic axial section.

FIG. 1 shows a drive apparatus 20 configured as a compact drive for a passenger door, in which an electrical drive motor 24 and a reduction gear unit 26, which is shown as a three-part planetary gear unit, are disposed in the axial direction one behind the other within a slim housing 22 formed in a tubular manner. The drive motor 24 is followed by a brake 28, which is also accommodated within the housing 22 and which can be configured as a "low active brake" that engages under spring force and can be released electromagnetically. Electrical connectors 30 of the drive motor 24 are also shown. The reduction gear unit 26 is configured to be non-self-locking.

Preferably, the drive apparatus 20 is accommodated in a rotation post which is not shown. A driven member (which is not visible) of the drive motor 24 is connected with an input element (which also is not visible) of the reduction gear unit 26, the output element 32 of which is connected with an input element or an actuating device of an entry/exit facility not shown. The output element 32 can be connected, for example, to a known lift-and-turn unit, the output element of which is connected with the actuating apparatuses for the entry/exit facility, for example, a passenger door. Moreover, an absolute value encoder 34 is disposed on the driven member 32 of the reduction gear unit 26, by means of which the momentary position of the driven member 32 configured as an output shaft is acquired and outputted as a value to an evaluation unit that is not shown and which compares the value with the value of a stored reference position. Moreover, a torque support 40 for coupling the drive apparatus 20 with the rotation post that is not shown can be seen.

Figure 2:
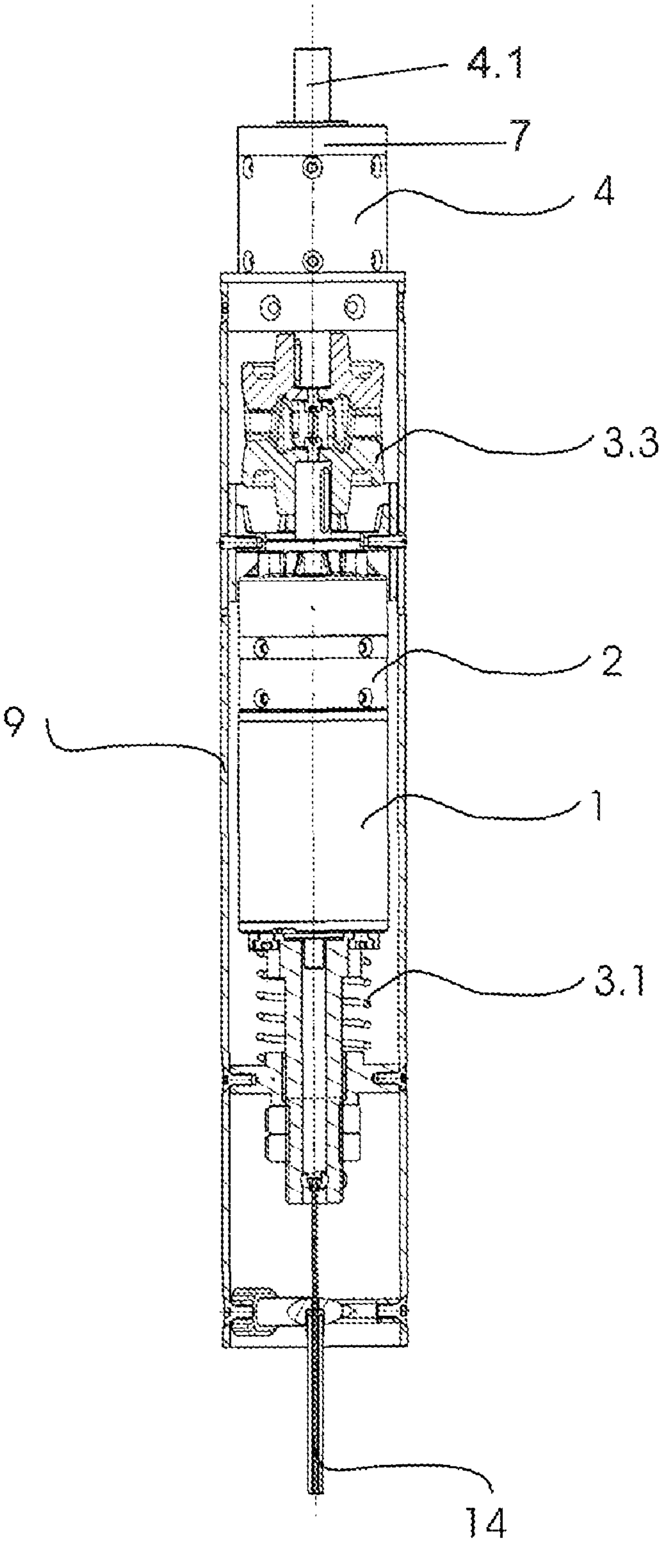
FIG. 2 shows a second embodiment of the drive system according to the invention for an entry/exit facility in a schematic axial section.

FIG. 2 shows a drive apparatus configured as a compact drive, for example for a passenger door, in which an electrical drive motor 1, a first reduction gear unit 2, a controllable coupling 3.3, and a second reduction gear unit 4 are disposed: More specifically, the first reduction gear unit 2 with the drive motor 1 and the first coupling half 3.3 connected therewith can jointly be axially connected to or separated from the second coupling half 3.4 and the second reduction gear unit 4 by axial displacement by means of the spring force of a compression spring 3.1. The drive motor 1 with the first reduction gear unit 2 is slidably mounted in the tubular housing 9 for this purpose. In emergency operation, a Bowden cable 14 tightens the compression spring 3.1 and axially displaces the drive motor 1, the first reduction gear unit 2 and the first coupling half 3.3 in the tubular housing 9, whereby the force transmission at the coupling 3.3, 3.4 is disengaged. Moreover, an absolute value encoder 7 is disposed on the driven member 4.1 of the second reduction gear unit 4, by means of which the momentary position of the driven member 4.1 configured as an output shaft is acquired and outputted as a value to an evaluation unit that is not shown and which compares the value with the value of a stored reference position. The output shaft 4.1 of the entire drive apparatus is connected in a manner that is not specifically shown with the actuation devices, for example a passenger door.

What is claimed is:

1. Drive system for an entry/exit facility with at least one door, ramp, or tread of a passenger transport vehicle that is mounted at least one of pivotably and slidably, the drive system comprising:

at least one actuator or drive motor and a mechanical system driven by at least one of said at least one actuator or drive motor and a gear unit for effecting pivoting or sliding movement of the door, ramp, or tread, with an absolute value encoder for acquiring a momentary position during the pivoting or sliding movement, and an evaluation unit, which is configured to compare a momentary position with at least one reference position stored in a non-volatile memory of the evaluation unit in order to generate an output signal dependent thereon, wherein the absolute value encoder is flange-connected to a pin that fixes the pivoting movement of the door, ramp, or tread, and the gear unit comprises a first reduction gear unit, a second reduction gear unit, and a controllable coupling is provided between the reduction gear units.

2. Drive system according to claim 1, wherein the output signal is used for controlling the drive motor or the actuator.

3. Drive system according to claim 1, wherein the output signal is analog or digital.

4. Drive system according to claim 1, wherein the output signal corresponds to a defined signal value in a case in which the momentary position corresponds to one of the reference positions.

5. Drive system according to claim 1, wherein the absolute value encoder acquires the pivoting or sliding movement without contact.

6. Drive system according to claim 1, wherein the absolute value encoder generates a digital signal for evaluation by the evaluation unit.

7. Drive system according to claim 1, wherein the absolute value encoder is flange-connected to a drive shaft of the drive motor.

8. Drive system according to claim 1, wherein the evaluation unit is programmable.

9. Drive system according to claim 1, wherein the mechanical system or the gear unit is configured to be non-self-locking.

10. Entry/exit facility for a passenger transport vehicle, comprising a drive system according to claim 1.

11. Passenger transport vehicle, comprising an entry/exit facility according to claim 10.

* * * * *